United States Patent [19]
Kitamura et al.

[11] Patent Number: 5,548,673
[45] Date of Patent: Aug. 20, 1996

[54] OPTICAL COUPLING DEVICE

[75] Inventors: Naoki Kitamura; Hiroshi Nishimoto, both of Tokyo, Japan

[73] Assignee: NEC Corporation, Japan

[21] Appl. No.: 427,486

[22] Filed: Apr. 24, 1995

Related U.S. Application Data

[63] Continuation of Ser. No. 276,405, Jul. 18, 1994, abandoned.

[30] Foreign Application Priority Data

Jul. 19, 1993 [JP] Japan .................................. 5-177735

[51] Int. Cl.$^6$ ..................................... G02B 6/30
[52] U.S. Cl. ............................... 385/49; 385/83
[58] Field of Search ........................... 156/662; 385/14, 385/46, 49, 51, 65, 83, 89

[56] References Cited

U.S. PATENT DOCUMENTS 4,880,494  11/1989  Kaukeinen et al. .

FOREIGN PATENT DOCUMENTS

| 0030281 | 6/1981 | European Pat. Off. . | |
|---|---|---|---|
| 0271025 | 6/1988 | European Pat. Off. . | |
| 4013630 | 12/1990 | Germany . | |
| 57-158824 | 9/1982 | Japan | 35/83 |
| 0094305 | 4/1989 | Japan | 385/49 |
| 2224129 | 4/1990 | United Kingdom . | |

OTHER PUBLICATIONS

Sheem et al; Integrated and guided-waves optics technical Digest; Incline Village, NY U.S.A. (28-30 Jan. 1980);"High Efficiency Single Mode Fiber/Channel Waveguide Flip Chip Coupling".
Patent Abstracts of Japan, vol. 4, No. 107 (P-21) 31 Jul. 1980 JP-A-55065913 (NTT) 17 May 1980.
Applied Optics, vol. 13, No. 12, Feb. 1974, pp. 391 to 395.
Integrated Photonics Research, TuD 6-1 and TuD 6-2, pp. 166 and 167, 1991.
The Spring Session In the Electron Information And Communication Academic Society, 1993, pp. 4-315

*Primary Examiner*—John Ngo
*Attorney, Agent, or Firm*—Laff, Whitesel, Conte & Saret, Ltd.

[57] ABSTRACT

In an optical coupling device for optically coupling an optical fiber to an optical waveguide formed on a crystalline substrate, the optical fiber is placed in a V-shaped groove formed on the substrate by anisotropic etching. The V-shaped groove is not linearly continuous, but intermittent to intermittently support the optical fiber. The intermittence of the V-shaped groove decreases undesired width expansion of the V-shaped groove. For this structure, a light axis alignment between the optical fiber and the optical waveguide is enhanced.

5 Claims, 4 Drawing Sheets

OPTICAL COUPLING DEVICE

This application is a continuation of application Ser. No. 08/276,405, filed Jul. 18, 1994 now abandoned.

FIELD OF THE INVENTION

The invention relates to an optical coupling device for optically coupling an optical fiber and an optical waveguide, and more particularly to, an optical coupling device in which the position alignment between an optical fiber and an optical waveguide is obtained with high precision and simple manipulation.

BACKGROUND OF THE INVENTION

In providing an optical communication system, an optical exchange system, etc, optical devices such as an optical modulator, an optical combining an branching device, an optical switch, an optical multiplexing and demultiplexing device etc. are generally used as based structural elements. These devices generally comprise optical waveguides. For this structure, it is inevitable to optically couple optical waveguides and optical fibers. The importance of the optical coupling between optical waveguides and optical fibers is enhanced under the situation where subscriber's networks have been increasingly changed to optical systems replacing electric systems, and optical devices have been more and more integrated into semiconductor substrates. In accordance with this tendency, the characteristics such as low loss of light, easy fabrication, stability against external force and heat are required for the optical devices.

Conventionally, an optical fiber and an optical waveguide are positioned to lower optical coupling loss to the minimum extent by using an optical jig, and fixed at the smallest coupling loss-position by using optical adhesive.

In this method of coupling the optical fiber to the optical waveguide, however, there are disadvantages in that (1) the position adjustment takes a long time, (2) the optical coupling process is carried out one by one to lower the mass-productivity, and (3) the reliability is low against external force.

In order to overcome the disadvantages, an optical coupling device for optically coupling an optical fiber to an optical waveguide has been proposed, for instance, as described on pages 391 to 395 of "Applied Optics, Vol. 13, No. 12, February 1974", on pages 166 and 167 of "Integrated Photonics Research, TuD 6-1 and TuD 6-2", and on page 4–315 of "the Spring session in the electron information and communication academic society, 1993".

The conventionally proposed optical coupling device comprises an optical waveguide having a core layer and a clad layer provided on a silicon substrate, and a V-groove formed on the silicon substrate to be aligned to the core layer of the optical waveguide.

In assembly, an optical fiber is positioned in the V-groove on the silicon substrate to be aligned to the core layer of the optical waveguide. In fabrication, a silicon substrate is anisotropically etched on a (100) plane, so that a V-groove having slant surface of (111) planes is formed on the silicon substrate.

In the conventional optical coupling device, however, there is a disadvantage in that the parallel relation of an opening of an etching mask to an crystalline axis of a silicon substrate is difficult to be precisely set up, because an orientation flat of the silicon substrate has an error of approximately ±1°. Unless the parallel relation is precisely set up, a width of a V-groove obtained by the anisotropic etching is larger than a specified value to lower the position precision of an optical fiber inserted into the V-groove. The detail of the disadvantage will be explained later.

SUMMARY OF THE INVENTION

Accordingly, it is an object of the invention to provide an optical coupling device in which an optical fiber and an optical waveguide are precisely aligned without any necessity of a complicated process.

It is a further object of the invention is to provide an optical coupling device which is fabricated by a process in which an etching mask is not required to be precisely aligned to a crystalline axis of a semiconductor substrate.

According to the invention, an optical coupling device, comprises:

a crystalline substrate having first and second regions;

an optical waveguide formed on the first region of the crystalline substrate;

a V-shaped groove formed on the second region of the crystalline substrate, the V-shaped groove being formed by anisotropic etching of the crystalline substrate; and an optical fiber placed in the V-shaped groove, a light axis of the optical fiber being aligned to a light axis of the optical waveguide to provide an optical coupling between the optical waveguide and the optical fiber;

wherein the V-shaped groove comprises inclined planes defining a V-letter in cross-section, each of the inclined planes being intermittent to support the optical fiber at an interval.

BRIEF DESCRIPTION OF THE DRAWINGS

The invention will be explained in more detail in conjunction with appended drawings, wherein.

DESCRIPTION OF THE PREFERRED EMBODIMENTS

Before describing an optical coupling device in the preferred embodiments according to the invention, the aforementioned conventional optical coupling device will be explained.

Figure 1A:
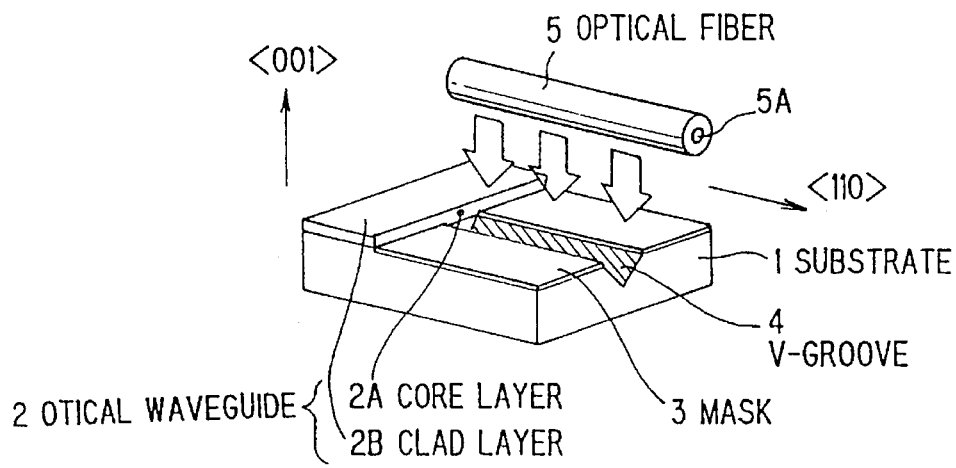
FIG. 1A is a perspective view showing an conventional optical coupling device.

FIG. 1A shows the conventional optical coupling device which comprises a silicon substrate 1 having a V-groove 4 for positioning an optical fiber 5 therein, and an optical waveguide 2 comprising a core layer 2A optically coupled to a core layer 5A of the optical fiber 5, and a clad layer 2B for surrounding the core layer 2A to confine a light thereinto.

In fabrication, a mask 3 is provided on a (100) plane of the silicon substrate 1, and anisotropic etching is carried out on the silicon substrate 1. Thus, the V-groove 4 is formed to have (111) planes on the slant surfaces.

Figure 1B:
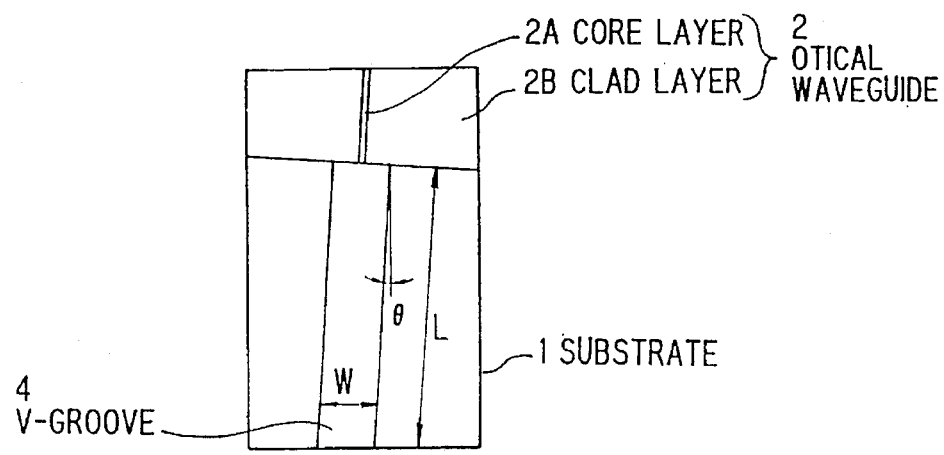
FIG. 1B is a plan view explaining the expansion in width of a V-groove in the conventional optical coupling device.
Figure 1C:
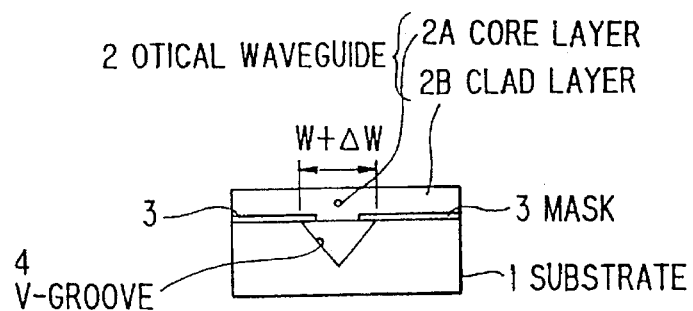
FIG. 1C is a cross-sectional view explaining the V-groove width-expansion in FIG. 1B, FIGS. 2 and 3 are perspective view showing optical coupling devices in first and second preferred embodiments according to the inventions.

In the optical coupling device, an axis of the V-groove 4 must be aligned with <110> direction of the silicon substrate 1. However, unless the parallel relation of the mask 3 to the silicon substrate 1 is precisely set up, as shown in FIG. 1B, the anisotropic etching of the silicon substrate 1 is effected with (111) planes left behind. As a consequence, the V-groove 4 is deviated in width to be large than the specified value W by $\Delta W$, as shown in FIG. 1C. As a result, it becomes difficult to precisely align the core layer 5A of the optical fiber 5 to the core layer 2A of the optical waveguide.

In FIG. 1B, if it is assumed that an angle deviation is $\theta$, a width of the V-groove 4 which is obtained at the time when sufficient etching is carried out is W, and a length of the V-groove 4 is L, $\Delta W$ is calculated by an equation of "L sin $\theta$".

Where L is 5 mm, and $\theta$ is 1°, $\Delta W$ is obtained to be 87 μm. In general, a width of an optical fiber is 125 μm. For these dimensions, the precise alignment between the core layer 2A of the optical waveguide 2 and the core layer 5A of the optical fiber 5 is difficult to be obtained. Generally available silicon substrates have orientation flats each having an error of approximately ±1°. Therefore, a specific evaluation must be sought to determine a precise crystalline axis of a silicon substrate. This means that a process is made complicated.

Figure 2:
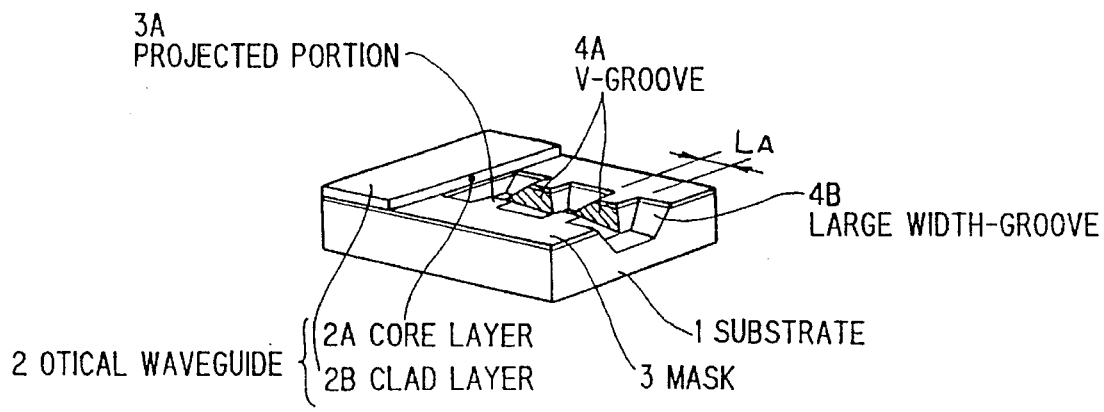

Next, an optical coupling device in the first preferred embodiment according to the invention will be explained in FIG. 2.

The optical coupling device comprises a silicon substrate 1, an optical waveguide 2 provided on the substrate 1, and V-grooves 4A linearly and intermittently formed on the substrate 1. In this optical coupling device, the optical waveguide 2 comprises a core layer 2A, and a clad layer 2B, and an end plane of the optical waveguide 2, to which an optical fiber (not shown) is optically coupled, is etched to be exposed, and each of the V-grooves 4A has a length $L_A$, and is separated from the other one by large width-grooves 4B.

In use, an optical fiber 15 is placed in the two V-grooves 4A, such that a tip plane of the optical fiber is in tight contact with the end plane of the optical waveguide 2, thereby providing the precise linear alignment between a core layer of the optical fiber and the core layer 2A of the optical waveguide 2. Finally, the optical fiber is fixed therein by using optical adhesive, etc.

In fabrication, a mask 3 having projected portions 3A is prepared to be provided on an optical waveguide-region and optical fiber-placing region of the silicon substrate 1, and the optical waveguide 2 comprising the core layer 2A and the clad layer 2B is formed on the mask 2 thus provided on the silicon substrate 1. Then, the optical waveguide 2 is etched to be removed except for the optical waveguide-region of the substrate 1.

Alternative to the above fabrication process, the optical waveguide 2 may be removed on the optical fiber-placing region of the substrate 1 prior to the provision of a mask 3, and the mask 3 may be provided on the optical fiber-placing region of the substrate 1 to carry out the formation of the V-grooves 4A and the large width-groove 4B.

In both of the former and latter fabrication processes, anisotropic etching is carried out to provide the intermittently formed V-grooves 4A, and the large width-grooves 4B for separating the V-grooves 4A.

In the former fabrication process, there is no step difference on the pattern of the mask 3 to mask the formation of fine configurations easier than the latter fabrication process, if there is no deterioration of the mask 3 under the optical waveguide 2 during the usage life.

In the first preferred embodiment, the V-grooves 4A are minutely dividend, and the length $L_A$ along which the optical fiber is contacted with the V-grooves 4A is shortened as compared to the length L in the conventional optical coupling device. Consequently, the width-expansion of the V-grooves 4A can be small. The shortened length $L_A$ can be small indefinitely to make the aforementioned width-expansion $\Delta W$ negligible. For this structure, the width-expansion of the V-grooves 4A caused by the deviation in the parallel relation of the V-grooves 4A to a crystalline axis of the silicon substrate 1 can be avoided.

Even if the V-grooves 4A are provided intermittently. The manipulation of placing an optical fiber therein is very simple without inviting any troublesome step.

Figure 3:
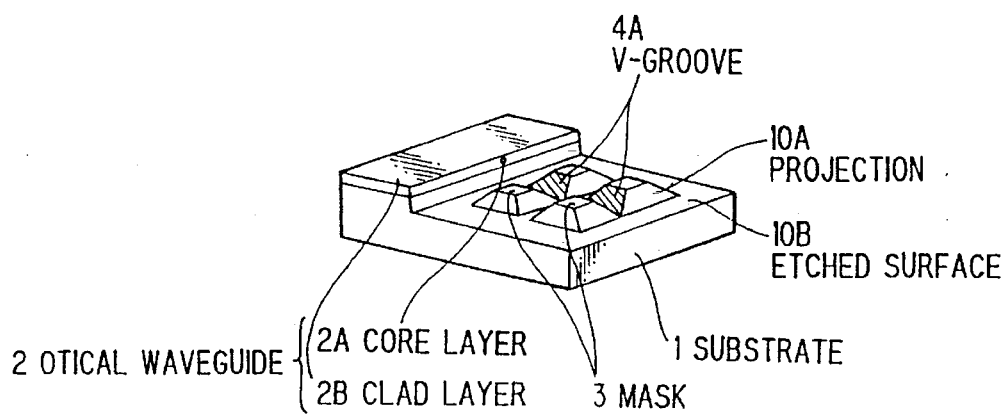
FIG. 3A is a perspective view of the optical coupling device of FIG. 3 with an optical fiber.
FIG. 3B is a plan view of the optical coupling device and fiber of FIG. 3A.
FIG. 3C is an end elevation of the optical coupling device and fiber, taken along line 3C—3C in FIG. 3A.
Figure 3A:
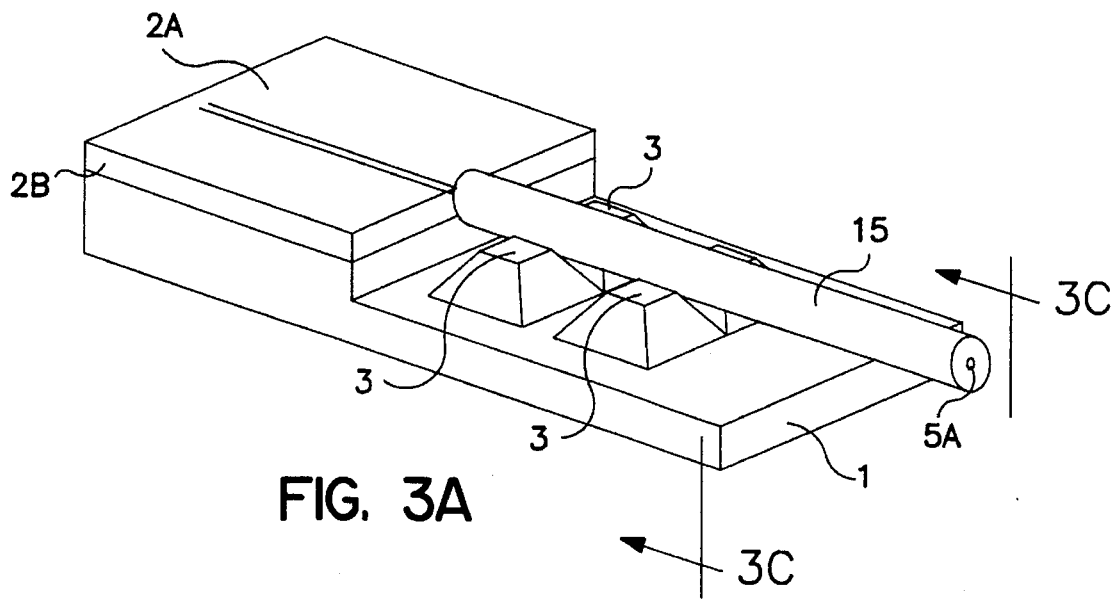
Figure 3B:
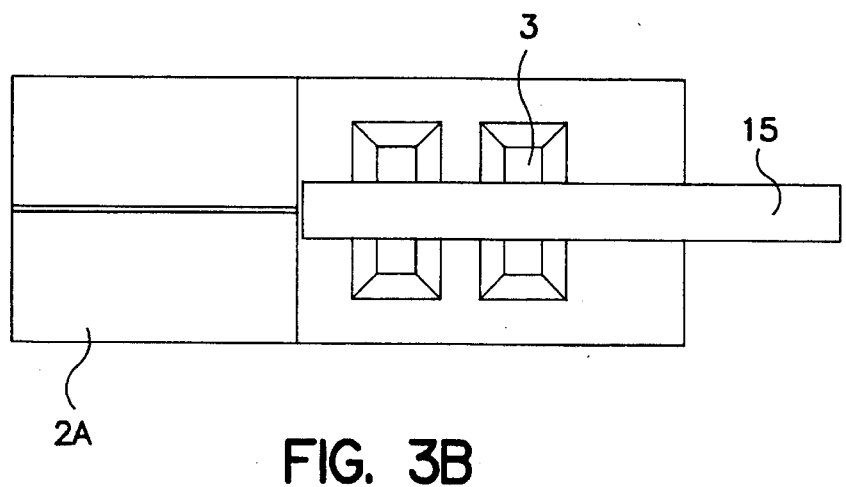
Figure 3C:
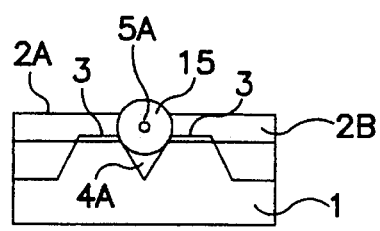

FIG. 3 shows an optical coupling device in the second preferred embodiment according to the invention, wherein like parts are indicated by like reference numerals, and the V-grooves 4A are provided in accordance with projections 10A formed by etching the remaining portion of the silicon substrate 1, thereby providing an etched surface 10B on the silicon substrate 1.

In fabrication, four rectangular island-like masks 3 are used to carry out anisotropic etching on the silicon substrate 1, so that two intermittently formed V-grooves 4A are obtained thereon.

Figure 4A:
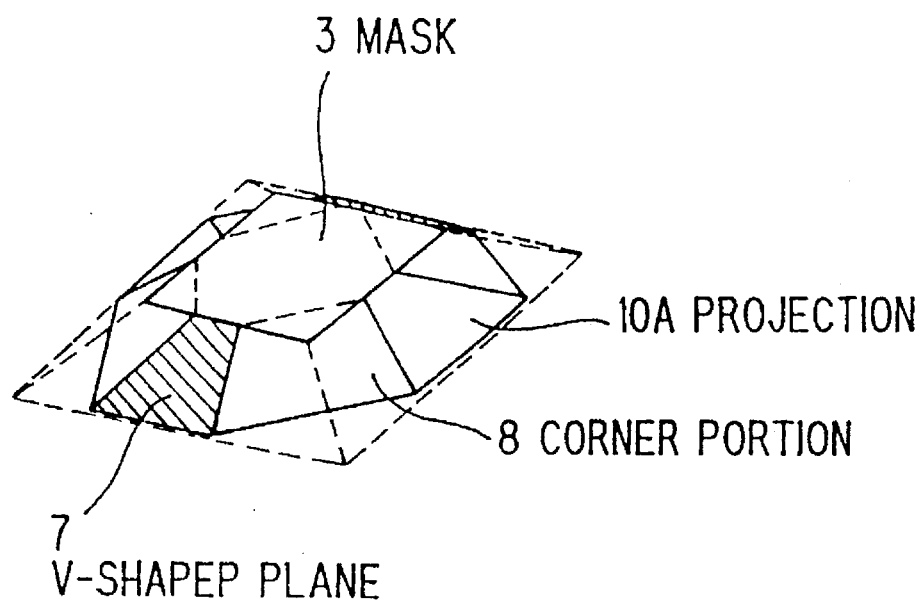
FIG. 4A is a perspective view showing etching at corners of a mask.

In the second preferred embodiment, there is a risk in which corner portions 8 of the projection 10A are etched to collapse a V-shaped plane 7 for the V-groove 4A, because a plane faster in etching rate than a (100) plane appears due to the edge-deformation of the mask 3, as the anisotropic etching progresses, as shown in FIG. 4A. In the worst case, the V-shaped plane 7 which is inevitable to provide the V-groove 4A is totally lost.

Figure 4B:
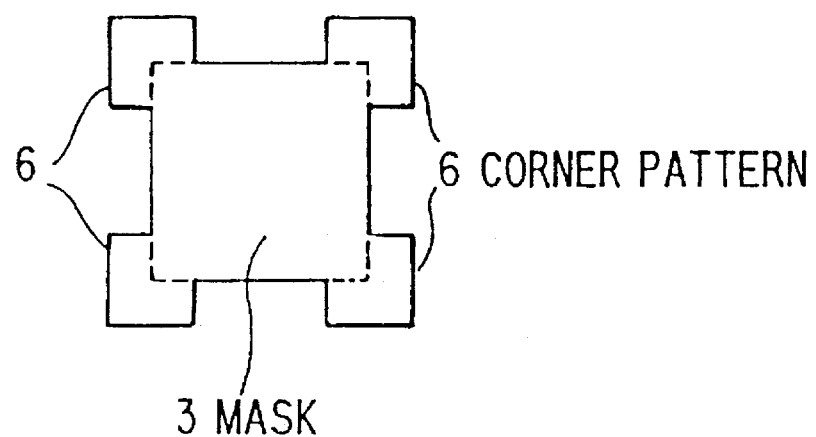
FIG. 4B is a plan view showing a mask for suppressing etching at corners thereof.

In consideration of the risk, it is preferable that a mask 3 having corner patterns 6, as shown in FIG. 4B, is used to avoid the etching of the corner portions 6 and provide a correctly defined V-shaped plane 7.

In the first and second preferred embodiments, although a single optical fiber is optically coupled to a single optical waveguide, a plurality of optical fiber may be optically coupled to a corresponding plurality of optical waveguides, and, although Si is used for the substrate 1, GaAs, InP, etc. may be adopted.

In case of using Si, a quartz based optical waveguide is obtained by doping P, Ge, B, Ti, etc. thereinto, and the fabrication process may adopt CVD method, EB evaporation method, spatter method, fire flame deposition method, etc. In case of using InP and GaAs, a semiconductor optical waveguide of InGaAsP, AlGaAs, etc. is often used. Further, solution such as KOH, KOH and alcohol, ethylene diamine and pilocathecohol, etc. may be used for anisotropical enchant for a silicon substrate, and solution such as $H_2SO_4$, $H_2O_8$ and $H_2O$, HCl, HBr, etc. may be used for anisotropical enchant for a GaAs or InP substrate. As a mask of the above enchants, a material lower in etching rate than a (100) plane of a substrate crystalline is selected from metal films, dielectric film, etc., and a thermal oxide film of Si is used for a Si-substrate.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. An optical coupling device, comprising:

a crystalline substrate having a top plane;

an optical waveguide formed on said top plane;

a plurality of V-shaped grooves formed on said crystalline substrate, said V-shaped grooves being formed by anisotropic etching of said crystalline substrate, each of said V-shaped grooves having the same size and configuration with each other and having two inclined planes;

a plurality of second grooves formed on said crystalline substrate, each of said second grooves having two inclined planes; each of said V-shape grooves being formed between two adjacent second grooves; and an optical fiber placed in said V-shaped grooves, a light axis of said optical fiber being aligned with a light axis of said optical waveguide to provide an optical coupling between said optical waveguide and said optical fiber;

wherein said optical fiber contact with said inclined planes of said V-shape grooves, and not contacted with said inclined planes of second grooves.

2. An optical coupling device, according to claim 1, wherein:

said optical waveguide is formed on said crystalline substrate by interposing a mask therebetween, said mask being a portion of a mask for etching said crystalline substrate to provide said V-shaped groove.

3. An optical coupling device, according to claim 1, wherein a width of at least one of said second grooves is larger than a width of one of said V-shaped grooves.

4. An optical coupling device, according to claim 3, wherein:

a depth of at least one of said second grooves is the same with a depth of one of said V-shaped grooves.

5. An optical coupling device, according to claim 1, wherein:

said inclined planes are portions of inclined side walls of projections, said projections being formed at intervals by anisotropic etching of said crystalline substrate.

* * * * *